United States Patent [19]

van den Boom et al.

[11] 4,003,845

[45] Jan. 18, 1977

[54] LUMINESCENT MATERIAL

[75] Inventors: Petrus Franciscus Josef van den Boom; Albert Leendert Nicolaas Stevels, both of Eindhoven, Netherlands

[73] Assignee: U.S. Philips Corporation, New York, N.Y.

[22] Filed: Apr. 9, 1976

[21] Appl. No.: 675,441

[30] Foreign Application Priority Data

Apr. 16, 1975 Netherlands .................. 7504502

[52] U.S. Cl. .................. 252/301.4 R; 313/486
[51] Int. Cl.² .................. C09K 11/46; H01J 1/63
[58] Field of Search .............. 252/301.4 R; 313/486

[56] References Cited

UNITED STATES PATENTS

| | | | |
|---|---|---|---|
| 3,693,006 | 9/1972 | Chenot | 252/301.4 R X |
| 3,836,477 | 9/1974 | Lagos | 252/301.4 R X |

FOREIGN PATENTS OR APPLICATIONS

| | | | |
|---|---|---|---|
| 2,261,424 | 7/1973 | Germany | 252/301.4 R |
| 46-33003 | 9/1971 | Japan | 252/301.4 R |
| 1,191,014 | 5/1970 | United Kingdom | 252/301.4 R |

OTHER PUBLICATIONS

Sakamoto et al "Japanese J. of Appl. Phys.," vol. 6, No. 11, 1967 p. 1315.

*Primary Examiner*—Jack Cooper
*Attorney, Agent, or Firm*—Frank R. Trifari; Norman N. Spain

[57] ABSTRACT

Luminescent cerium- and manganese-activated aluminate which is defined by the formula $$La_{1-x-p}Ba_xCe_pAl_{y-q}Mn_qO_{1.5y+1.5-0.5x-0.5q}$$

where $$10 \leq y \leq 13$$
$$0.10 \leq x \leq 0.75$$
$$0.05 \leq p \leq 0.75$$
$$x + p \leq 0.90$$
$$0.10 \leq q \leq 0.50$$

4 Claims, No Drawings

LUMINESCENT MATERIAL

The invention relates to a luminescent material comprising a luminescent cerium- and manganese-activated aluminate, to a luminescent screen including such a luminescent material, and to a low pressure mercury vapour discharge lamp including such a luminescent screen.

United Kingdom patent specification No. 1,194,014 discloses a luminescent cerium aluminate having a composition defined by the formula $xCe_2O_3 \cdot yAl_2O_3$, where the ratio $x : y$ has a value of from 1 : 8 to 1 : 13. This aluminate whose formula may also be written as $CeAl_yO_{1.5y+1.5}$ where $8 \leq y \leq 13$, shows an efficient Ce emission upon excitation. Said patent specification furthermore describes the activation of the cerium aluminate by manganese. In that case the exciting energy is transferred from the Ce-activator to the Mn-activator. This energy transfer can be very complete so that substantially only the Mn-emission is obtained in a bandwith a maximum at 515 nm. Luminescent materials with efficient Mn emission at 515 nm can be used with great advantage in low-pressure mercury vapour discharge lamps intended for reprographical purposes, for example, for xerography. A disadvantage of the known Mn-activated cerium aluminate is that at a maximum energy transfer the efficiency of the Mn emission is relatively low and that at a maximum efficiency of the Mn emission a relatively large part of the total emission comes from the Ce. For these materials this Ce-emission is in the blue part of the spectrum (maximum at 450 nm) and is very annoying if the materials are used for reprographical purposes.

It has been found that luminescent materials having a higher efficiency of Mn-emission are obtained if in the known Mn-activated cerium aluminate a part of the Ce is replaced by La. The Ce-radiation still transmitted by these materials is shifted in the spectrum to shorter wavelengths and is mainly in the ultra-violet part of the spectrum so that, when used in lamps, this radiation causes less trouble although the Ce-emission in the blue part of the spectrum is still noticeable with these materials. As is the case in cerium aluminate the radiant energy of the Ce-emission must be considered as lost.

An article in Jap. J. of Appl. Phys., Vol. 6, No. 11, (November 1967) page 1315, discloses a Ce- and Mn-activated calcium aluminate which has a composition defined by the formula $CaAl_{10}O_{16}$-Ce:Mn. The radiation efficiency of this material and also of the corresponding strontium compound is high, but the energy transfer from Ce to Mn, is inefficient, so that in these materials much energy is lost in the Ce-emission band (maximum at approximately 330 nm). It has been found that in the similar Ce-activated barium aluminate, the said energy transfer is much more efficient. However, the Ce-activated barium aluminate has a relatively small total radiation efficiency.

The invention provides a luminescent material comprising a luminescent Ce- and Mn-activated aluminate having a composition defined by the formula $La_{1-x-p}Ba_xCe_pAl_yMn_qO_{1.5y+1.5-0.5x-0.5q}$
where $10 \leq y \leq 13$
$0.10 \leq x \leq 0.75$
$0.05 \leq p \leq 0.75$
$(x+p) \leq 0.90$
$0.10 \leq q \leq 0.50$.

During the investigations which led to the invention it was found that when lanthanum was partly replaced by barium in Ce- and Mn-activated lanthanum aluminate, materials are obtained which have very little Ce-emission. Insofar as it is still present, the Ce-emission from materials according to the invention is substantially only found in the ultraviolet part of the spectrum so that this emission is not annoying in lamp uses. The total efficiency of the aluminates according to the invention is high and comparable to that of lanthanum aluminate. This was not to be expected as the Ce- and Mn-activated barium aluminate, as indicated above, has a relatively low total efficiency.

As mentioned above the Al content $y$ of a material according to the invention has a value of from 10 to 13. Outside this range materials are found whose light output is too low for practical applications. The highest luminous fluxes are obtained with aluminates according to the invention, in which $y$ has a value of from 11 to 12. Consequently these values of $y$ are preferred.

It has appeared that also at relatively high Ba contents the high efficiency of the luminescent material is maintained. However, the Ba-content $x$ is not chosen to be higher than 0.75. Values of $x$ smaller than 0.10 are not used because then the effect of the barium addition is too small. The Ce-content $p$ should have a value of from 0.05 to 0.75. For values of $p$ below 0.05 the absorption of the exciting ultra-violet radiation is too small. For values of $p$ exceeding 0.75 the contribution of the Ce-emission is too large. The sum of the Ba-content and the Ce-content $(x + p)$ should be smaller than 0.90 as the aluminate must contain at least 0.10 mole per mole of La, in order to obtain high efficiencies. The Mn-content $q$ in the materials according to the invention has a value in the range of from 0.10 to 0.50. For values of $q$ smaller than 0.10 the transfer of Ce to Mn is too small. For values of $q$ exceeding 0.50 quenching of the Mn-emission is found and an annoying emission of quadravalent Mn may be bound in the red part of the spectrum.

Preference is given to materials according to the invention in which the Ba-content $x$, the Ce-content $p$ and the Mn-content $q$ satisfy the following conditions $0.20 \leq x \leq 0.50$
$0.20 \leq p \leq 0.50$
$0.20 \leq q \leq 0.40$, because with these materials the highest luminous fluxes are obtained in the green manganese band at 515 nm.

It has been found that up to 75 mole% of the quantity of Ba used may be replaced by Sr and/or Ca. Such a replacement is only of little influence on the total efficiency of the material and also has no influence on the Ce-emission and the green Mn-emission. However, an advantage of this replacement is that the weak emission of quadravalent manganese possibly occurring in the red part of the spectrum, is further suppressed.

The luminescent materials according to the invention are preferably used in the luminescent screen of mercury vapour discharge lamps, more specifically low-pressure mercury vapour discharge lamps for electrophotographic purpose, for example for xerography. Compared with lamps provided with Mn-activated magnesium gallate aluminate with spinel structure, which have frequently been used for xerography, the lamps according to the invention have the advantage of an emission having a slightly longer wavelength, (maximum at 515 nm instead of at 505 nm) and a greater peak height of the emission band. Compared with lamps provided with europium- and manganese-activated materials which have also been proposed for xerography, the lamps according to the invention have the advantage that they do not have a disturbing emission in the blue part of the spectrum.

The luminescent aluminates according to the invention may be manufactured by known general methods for the synthesis of luminescent materials. They are preferably manufactured by a solid-state reaction at an elevated temperature. To this end a mixture of starting materials is heated one or more times, for example, for one hour at a temperature of between approximately 1100° and 1700° C. The oxides of the desired elements or compounds which produce these oxides upon heating (for example, carbonates) are used as starting materials. To bring or maintain the activators in the bivalent state, at least a (last) heat treatment in a weakly-reducing atmosphere is required. It is possible to add part of the alkaline earth metal or aluminium as a fluoride to the reaction mixture in order to enhance the formation reaction.

Some embodiments of the invention will now be described with reference to the following Examples. Examples A and B are both outside the scope of the invention and are included for comparative purposes.

Examples

A mixture was made consisting of
0.125 mol $La_2O_3$
0.25 mol $BaCO_3$
5.79 mol $Al_2O_3$
0.12 mol $AlF_3 \cdot 3H_2O$
0.50 mol $LeO_2$
0.30 mol $MnCO_3$.

This mixture was heated in a furnace for one hour in a weakly-reducing atmosphere at a temperature of 1400° C. The weakly-reducing atmosphere consisted of a nitrogen-hydrogen mixture containing a few % by volume of hydrogen. After cooling the product obtained was ground and sieved and was then ready for use. The luminescent material obtained had a composition defined by the formula $La_{0.25} Ba_{0.25} Ce_{0.50} Al_{11.7}MnO.3 O_{19.225}$.

Analogously as described above, a number of luminescent aluminates have been manufactured, the formulae of which are given in the Table below. Results of measurements performed on these aluminates are mentioned in the Table. The Table gives under $q/_{ce}$ and $q/_{Mn}$ the quantum efficiency (in %) of the cerium- and the manganese-emission, respectively (upon excitation by radiation having a wavelength of 254 nm). Under $I_{450}$ the Table mentions for each example the intensity of the emission at 450 nm in % of the intensity of the emission at 515 nm. Examples A and B are given by way of comparison and relate to the known cerium- and manganese-activated lanthanum aluminate and the known cerium- and manganese-activated barium aluminate, respectively.

TABLE

| | Formula | q/ce | q/Mn | $I_{450}$ |
| --- | --- | --- | --- | --- |
| A | $La_{0.9}Ce_{0.1}Al_{11.8}Mn_{0.2}O_{19.4}$ | 21.5 | 62.5 | 5.3 |
| B | $Ba_{0.5}Ce_{0.5}Al_{11.8}Mn_{0.2}O_{19.15}$ | 9 | 58.5 | 1.0 |
| 1 | $La_{0.7}Ba_{0.25}Ce_{0.05}Al_{11.8}Mn_{0.2}O_{19.275}$ | 20 | 64 | 0.8 |
| 2 | $La_{0.45}Ba_{0.50}Ce_{0.05}Al_{11.8}Mn_{0.2}O_{19.15}$ | 19 | 62 | 0.2 |
| 3 | $La_{0.20}Ba_{0.75}Ce_{0.05}Al_{11.8}Mn_{0.2}O_{19.025}$ | 16 | 62 | <0.1 |
| 4 | $La_{0.25}Ba_{0.25}Ce_{0.50}Al_{11.7}Mn_{0.3}O_{19.225}$ | 9 | 73 | 2.1 |
| 5 | $La_{0.25}Ba_{0.25}Ce_{0.50}Al_{11.6}Mn_{0.4}O_{19.175}$ | 4 | 67 | 0.4 |
| 6 | $La_{0.25}Ba_{0.30}Ce_{0.45}Al_{11.7}Mn_{0.3}O_{19.2}$ | 8 | 66.5 | 1.8 |
| 7 | $La_{0.25}Ba_{0.35}Ce_{0.40}Al_{11.7}Mn_{0.3}O_{19.175}$ | 7 | 65 | 1.4 |
| 8 | $La_{0.25}Ba_{0.40}Ce_{0.35}Al_{11.7}Mn_{0.3}O_{19.15}$ | 6.5 | 68.5 | 0.6 |
| 9 | $La_{0.25}Ba_{0.45}Ce_{0.30}Al_{11.7}Mn_{0.3}O_{19.125}$ | 7.5 | 66.5 | 0.6 |
| 10 | $La_{0.25}Ba_{0.50}Ce_{0.25}Al_{11.7}Mn_{0.3}O_{19.1}$ | 7 | 65 | <0.1 |
| 11 | $La_{0.25}Ba_{0.20}Sr_{0.20}Ce_{0.35}Al_{11.7}Mn_{0.3}O_{19.15}$ | 7.5 | 71.5 | 0.5 |
| 12 | $La_{0.25}Ba_{0.20}Ca_{0.20}Ce_{0.35}Al_{11.7}Mn_{0.3}O_{19.15}$ | 7.5 | 70.5 | 0.5 |
| 13 | $La_{0.25}Ba_{0.133}Sr_{0.133}Ca_{0.133}Ce_{0.35}Al_{11.7}Mn_{0.3}O_{19.15}$ | 7.5 | 74 | 0.5 |

What is claimed is:

1. A luminescent material consisting essentially of a luminescent cerium- and manganese-activated aluminate having a composition defined by the formula $La_{1-x-p}Ba_xCe_pAl_{y-q}Mn_qO_{1.5y+1.5-0.5x-0.5q}$ where $10 \leq y \leq 13$
$0.10 \leq x \leq 0.75$
$0.05 \leq p \leq 0.75$
$(x+p \leq 0.90)$
$0.10 \leq q \leq 0.50$.

2. A luminescent material as claimed in claim 1, wherein $11 \leq y \leq 12$.

3. A luminescent material as claimed in claim 2, wherein
$0.20 \leq x \leq 0.50$
$0.20 \leq p \leq 0.50$
$0.20 \leq q \leq 0.40$.

4. A luminescent material as claimed in claim 1, wherein up to 75 mole% of the Ba is replaced by Sr and/or Ca.

* * * * *

UNITED STATES PATENT AND TRADEMARK OFFICE
CERTIFICATE OF CORRECTION

PATENT NO. : 4,003,845
DATED : January 18, 1977
INVENTOR(S) : PETRUS FRANCISCUS JOSEF VAN DEN BOOM ET AL It is certified that error appears in the above-identified patent and that said Letters Patent are hereby corrected as shown below:

Column 4, line 45, "(x+p $\leq$ 0.90" should read -- (x+p) $\leq$ 0.90 --.

Signed and Sealed this

Eleventh Day of April 1978

[SEAL]

Attest:

RUTH C. MASON
Attesting Officer

LUTRELLE F. PARKER
Acting Commissioner of Patents and Trademarks